F. A. ELLIS, Jr.
DETACHABLE WHEEL FOR AUTOMOBILES.
APPLICATION FILED OCT. 14, 1921.
1,421,189.
Patented June 27, 1922.
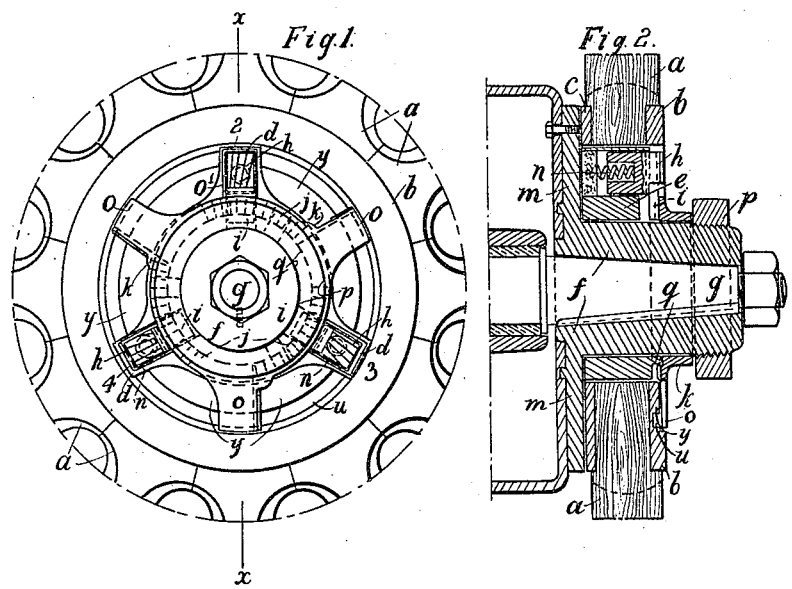
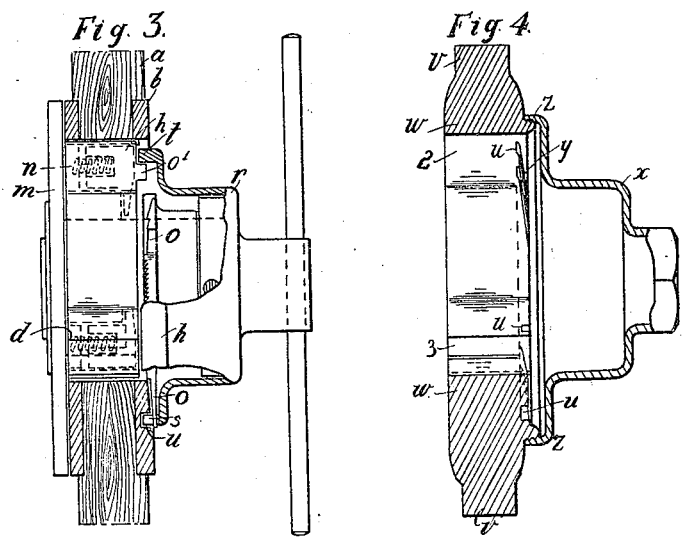
Inventor-
Frederick Arthur Ellis, Jr.
By B. Singer, Atty

UNITED STATES PATENT OFFICE.

FREDERICK ARTHUR ELLIS, JR., OF LONDON, ENGLAND.

DETACHABLE WHEEL FOR AUTOMOBILES.

1,421,189.  Specification of Letters Patent.  Patented June 27, 1922.

Application filed October 14, 1921. Serial No. 507,710.

*To all whom it may concern:*

Be it known that I, FREDERICK ARTHUR ELLIS, Jr., a subject of the King of Great Britain, and resident of London, England, have invented certain new and useful Improvements in Detachable Wheels for Automobiles, of which the following is a specification.

This invention relates to detachable wheels for automobile vehicles and has particular reference to the construction of the central portion or boss together with means for locking the wheel in position.

The object of the invention is to provide simple means whereby one wheel may be detached or removed from the vehicle and replaced by another.

The improvements hereinafter more particularly described are equally applicable to what are known as the wooden wheels, whole-steel wheels, or composite wheels.

In carrying out my invention for the conversion of the ordinary automobile road wheel into a detachable wheel, the ordinary hub or nave is removed therefrom and substituted by a radially slotted reinforced bore that is slipped on to what may be termed a false boss, hub or nave which is slipped on to the existing hub and retained thereon by any convenient means such as the ordinary bolts connecting the flanges, the false hub or nave being of such a nature as to support and carry the wheel which in turn is slipped thereon and retained between the front and back flanges thereof by a locking ring hereinafter referred to. The false hub or nave is provided with three or more hollow radial fins which serve the purpose of preventing the wheel rotating thereon. These hollow fins contain helical springs that press forward a key or pawl that engages with a segmental rack that is formed on the inside of a locking ring by which the wheel is retained in its position on the false hub or nave. The helical springs aforesaid are preferably embedded in rubber or the like which practically fills the space contained within the hollow radiating fins, the locking ring is provided with radiating projections that are more or less coincident with the radiating fins so that when the same is turned in the position when they do actually coincide the wheel can be slid off from the central nave over the said projections which otherwise retain the wheel in position on the false hub or nave.

The inside of the locking ring is provided with inclined toothed racks that engage with the spring urged keys or pawls contained in the aforesaid hollow radiating fins. When it is desired to remove the wheel after it has been locked in its position on the false hub or nave, by the application of a suitable spanner the spring urged keys or pawls can be depressed so that the locking ring may be turned in order that the projections on the said ring may become coincident with the aforesaid fins and the wheel then is readily removed.

Obviously the ordinary hub or nave in the first instance may be made with radiating fins as above described in which case there would be no need for the employment of a false hub or nave.

In order that my invention may be clearly understood reference may now be had to the accompanying drawing in which Figure 1 is an elevation illustrating my improvements applied to a well known type of wooden wheel, Figure 2 being a section on line $x$—$x$ of Figure 1 as viewed from left to right, Figure 3 a similar transverse sectional elevation on the line $x$—$x$ showing the application of the spanner or tool for manipulating the keys or pawls and the locking ring for removal of the wheel and Figure 4 a transverse sectional elevation of the nave or hub of a steel wheel with the driving boss and locking ring removed.

Similar letters of reference relate to like parts in all the figures.

Referring now to the drawing and particularly to Figures 1 to 3 it will be seen that the spokes $a$ of the wooden wheel terminate as usual towards the nave or centre where are affixed thereto the front and back plates $b$ and $c$, the central portion of the wheel and the said plates being cut out in form of slots 2, 3 and 4 to accommodate the hollow radial fins $d$ of the false hub or nave $e$ which is fixed by any convenient means to the hub or nave $f$ that is secured to the axle $g$. The interior of the slotted bore of the wheel $a$ may be metal lined by the addition of a boss or bosses to the front and back plates $b$ and $c$.

The hollow fins $d$ are each provided with spring urged keys or pawls $h$ with inwardly projecting portions $i$ that engage with segmental racks $j$ formed on the inside of the locking ring $k$ by means of which the wheel is held in its position against the back plate $m$ of the nave or boss $f$. The spring urged keys $h$ are contained in suitable housings provided on the false hub or nave $e$ in such a manner as to exclude therefrom dust or dirt and at the base of the housing may be provided rubber which forms a fixing for the helical springs $n$.

The locking ring $k$ is provided with projections $o$ that are disposed to agree relatively with the slots 2, 3 and 4 of the wheel and the plate $b$ is provided with segmental inclined surfaces $y$ extending from 2 towards 3 and 3 towards 4 and 4 towards 2 respectively so that when the locking ring is turned clockwise pressure is imparted to the wheel so that it is forced firmly against the back plate $m$ of the original hub or nave $f$ and as soon as the projection $o$ leaves contact with the keys or pawls $d$ the extensions $i$ engage with the segmental racks $j$ provided around the inner face of the locking ring $k$. The locking ring $k$ is retained in its position on the hub or nave $f$ by the nut $p$ and is rotatable between the face of the nut and the small collar or boss $q$ formed on the false hub or nave $e$ so that on depressing the keys or pawls $h$ by the application of the box spanner $r$ the extensions $i$ are disengaged from the racks $j$ in order that the projections $o$ may be turned thereby into their respective positions coincident with the slots 2, 3 and 4 and the wheel removed.

The box spanner $r$ is clearly seen in Figure 3 and around its periphery is provided with slots $s$ that embrace the projections $o$ the depending edge $t$ rotating in the groove $u$ and effecting the depression of the keys or pawls $h$ and thereby disengage the extensions $i$ with the racks $j$ so that the locking ring $k$ may be rotated, a suitable stop $o^1$ determining the limit of rotation for effecting the removal. It will be obvious that other forms of tools may be employed for effecting this operation without departing from the nature of my invention and the whole device as illustrated in Figures 1 to 3 may be enclosed by any suitable dust-proof casing fixed to the plate $b$ by any convenient means.
Figure 4 shows the formation of a metallic hub or nave embodying my improvement for the construction of a steel wheel the spokes of which may be attached by any convenient means to the radiating projections $v$ of the cast hub or nave $w$ which is provided with the slots 2, 3 and 4 as shown in Figure 1 the outer face being provided with the inclined surfaces $y$ against which the projections $o$ of the locking ring act and in order to illustrate clearly these inclined surfaces the boss and axle have been omitted from this figure. A convenient form of enclosure or dust proof casing $x$ is shown in this figure that is screwed on to the boss $z$ of the hub or nave $w$.

What I claim is:—

1. The combination, with an ordinary automobile road wheel having a radially slotted reinforced bore, a false hub secured to the hub of said wheel, and radially disposed hollow fins on said false hub coacting with slots in said reinforced bore of means for locking a wheel on said false hub.

2. The combination, with an ordinary automobile road wheel having a radially slotted reinforced bore, a false hub secured to the hub of said wheel, and radially disposed hollow fins on said false hub coacting with the slots in said reinforced bore of a rotatable locking ring and means for securing said ring in its locked position.

3. The combination, with an ordinary automobile road wheel having a radially slotted reinforced bore, a false hub secured to the hub of said wheel, and radially disposed hollow fins on said false hub coacting with the slots in said reinforced bore of a series of segmental inclined surfaces on said wheel, a rotatable locking ring engaging with said inclined surfaces and spring urged keys housed in said hollow fins for securing said ring in its locked position.

4. In combination, an ordinary automobile road wheel having a radially slotted bore, front and back plates for reinforcing said bore, a false hub secured to the hub of said wheel, radially disposed hollow fins on said false hub engaging with the slots in said bore, spring urged keys carried by said hollow fins, projections on said keys, a rotatable locking ring, segmental racks on the inside of said ring, radial projections on the outside thereof and a series of inclined surfaces on the aforesaid reinforcing back plate.

5. In combination, an ordinary automobile road wheel having a radially slotted bore, front and back plates for reinforcing said bore, a false hub secured to the hub of said wheel, radially disposed hollow fins on said false hub engaging with the slots in said bore, spring urged keys carried by said hollow fins, projections on said keys, a rotatable locking ring, segmental racks on the inside of said ring, radial projections on the outside thereof a series of inclined surfaces on the aforesaid reinforcing back plate, and means for operating said locking ring.

In testimony whereof I affix my signature.

FREDERICK ARTHUR ELLIS, Jr.